S. NYE.
SPROCKET CHAIN LINK.
APPLICATION FILED SEPT. 1, 1909.
957,996.
Patented May 17, 1910.
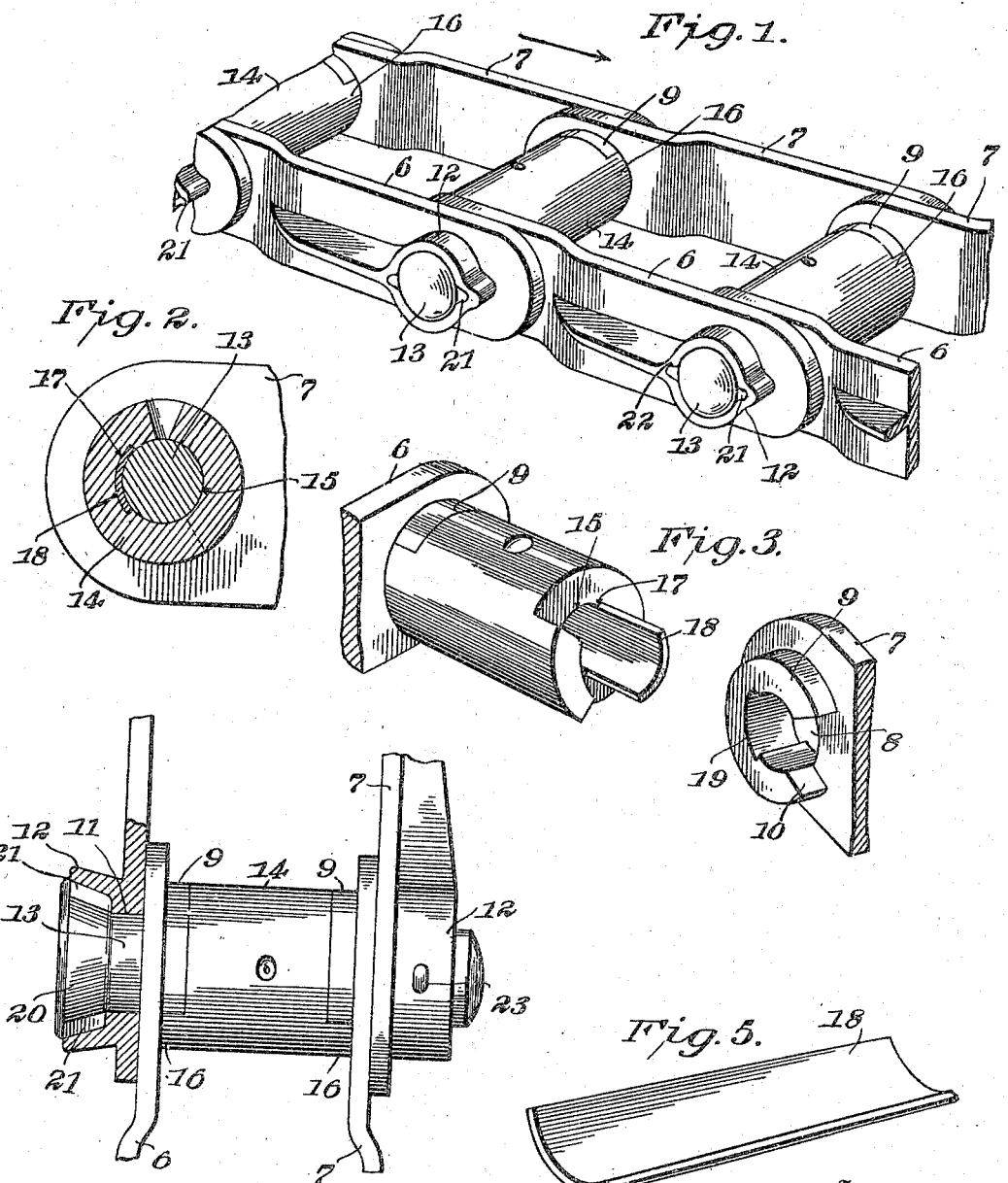

UNITED STATES PATENT OFFICE.

SAMUEL NYE, OF CORBIN, IDAHO, ASSIGNOR OF ONE-HALF TO AUSTIN CORBIN, 2D, OF SPOKANE, WASHINGTON.

SPROCKET-CHAIN LINK.

957,996.  Specification of Letters Patent. Patented May 17, 1910.

Application filed September 1, 1909. Serial No. 515,649.

*To all whom it may concern:*

Be it known that I, SAMUEL NYE, a citizen of the United States, residing at Corbin, in the county of Kootenai and State of Idaho, have invented certain new and useful Improvements in Sprocket-Chain Links, of which the following is a specification.

My invention relates to certain new and useful improvements in sprocket or drive chains, and the object of my invention is to provide a chain having links which are inexpensive to manufacture, strong and durable, and in which the parts subject to wear may be readily removed when worn and new parts substituted.

A further object is to provide a link in which the strain is evenly divided between the sides whereby the danger of the link breaking is greatly lessened.

With these and other objects in view my inventions consists in certain constructions, combinations and arrangements of parts the preferred embodiment of which will be first described in connection with the accompanying drawing and then the invention particularly pointed out in the appended claims.

Referring to the drawing wherein the same part is designated by the same reference numeral wherever it occurs, Figure 1 is a perspective view of a portion of a sprocket or drive chain, the links of which are constructed in accordance with the preferred embodiment of my invention; Fig. 2 is a central cross section through a connecting or cross bar; Fig. 3 is a perspective view of one end of a link with the pin removed and one side of the link shown separated from the connecting bar; Fig. 4 is a top plan view partly in section of a pair of links as connected together, the outer ends of the links being broken off, and Fig. 5 is a detail perspective view of the bushing or brass in the connector.

6, 7 are the side bars of each link, the bars being each provided at one end with openings 8, and 9 are bosses extending from the inner surface of the side bars and partly surrounding the openings, the bosses being cut away at 10, for a purpose to be hereinafter described. The side bars are formed so that they diverge from the ends having the openings 8, when the links are connected together, whereby the diverging ends may embrace the sides of the next link. In the divergent ends of the sides are openings 11, and 12 are bosses extending from the outer surface of the side bars and surrounding the openings for the purpose of increasing the length of the bearings for the pins 13 which pass through said openings.

14 designates the connecting or cross bar which, preferably, and as shown, is slightly oval in cross section, in order to increase the amount of metal at the sides where the wear against the sprocket teeth comes. The connectors are bored as shown at 15 to a size to receive the pin 13, and on each end are provided with the projecting boss or lug 16, these lugs being of a size to fit in the openings 10 in the bosses 9 and hold the cross bars from turning when they come in contact with the sprocket teeth. Preferably and as shown the bosses 16 are so located that when the parts are in position as shown in Fig. 1 the bosses will be on the front of the cross bars when the chain is being pulled in the direction of the arrow, shown in Fig. 1. As the greater portion of the wear of the connecting pin is on the rear side of the bore 15 of the connector I preferably cut a groove 17 in the rear side of the bore in which is placed a removable bush or brass 18. The bush 18 is preferably of such a length that it will extend clear through the openings 8 in the sides, and these openings and their bosses 9 are therefore provided with grooves 19 to receive the bush. The connecting pins 13 are preferably each provided on one end with a head 20 having wings 21 extending therefrom adapted to enter ways 22 formed in the bosses 12 of the sides 6 and 7, so that the pin is held from turning in the side bars. The pins are each held in position by any suitable means, as by a cotter pin 23 extending through the boss of the side bar 7 and the end of the pin.

In constructing the parts the side bars 6 and 7 are preferably made of cast steel as they receive the greatest strain, but have very little wear. The connecting bars receive the greatest portion of the wear but are not liable to break, and can therefore be made of cast iron, preferably malleable, which reduces the cost. The pins can also be made of the same material. The bushes may also be made of cast iron, brass or the like. It will thus be seen that the parts which carry the maximum strain are subjected to the minimum wear and are made of high grade metal, while the parts which receive the maximum wear carry the minimum strain and can therefore be made of low grade metal. In addition by this construction there is sufficient play between the parts to equalize the strain on the side bars if the sprockets are not exactly in line, whereas in a one piece link the strain is put on one side bar under such circumstances.

I realize that considerable variation is possible in the details of construction and arrangement of parts without departing from the spirit of my invention, and I therefore do not intend to limit myself to the specific form shown and described.

What I claim as new and desire to secure by Letters Patent is—

1. A drive or sprocket chain comprising, in combination, overlapping side bars, said side bars being provided with registering openings through their overlapping portions, the inner face of the inner bars being provided with bosses which partly surround the openings in said inner bars, connecting bars extending between the overlapped portions of the side bars, each of said connecting bars being bored, and provided with bosses extending from the ends of the connecting bars adapted to coöperate with the bosses on the side bars to hold the connecting bars against rotation, and pins passing through the openings in the side bars and connecting bars as set forth.

2. A drive or sprocket chain comprising, in combination, overlapping side bars, connecting bars extending between the overlapped portions of the side bars, said side bars and connecting bars being provided with projecting interlocking means to hold the connecting bars from rotation, pins passing through the overlapped portions of the side bars and connecting bars, said pins being provided with oppositely extending wings, and said side bars being provided with slots adapted to receive said wings, whereby the pins are held from rotation in the side bars.

In testimony whereof I affix my signature in presence of two witnesses.

SAMUEL NYE.

Witnesses:
 ALBERT ALLEN,
 W. A. BROWN.